United States Patent
Miller et al.

(10) Patent No.: US 11,914,644 B2
(45) Date of Patent: Feb. 27, 2024

(54) SUGGESTED QUERIES FOR TRANSCRIPT SEARCH

(71) Applicant: Microsoft Technology Licensing, LLC, Redmond, WA (US)

(72) Inventors: Adi Miller, Ramat Hasharon (IL); Haim Somech, Herzliya (IL); Michael Sterenberg, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 17/498,296

(22) Filed: Oct. 11, 2021

(65) Prior Publication Data
US 2023/0115098 A1    Apr. 13, 2023

(51) Int. Cl.
*G06F 16/248*    (2019.01)
*G06F 16/683*    (2019.01)
(Continued)

(52) U.S. Cl.
CPC .......... *G06F 16/685* (2019.01); *G06F 3/0481* (2013.01); *G06F 3/0484* (2013.01);
(Continued)

(58) Field of Classification Search
CPC .. G06F 3/0481; G06F 3/0484; G06F 16/2433; G06F 16/3329; G06F 16/3344; G06F 16/338; G06F 16/374; G06F 16/685; G06F 40/216; G06F 40/295; G06F 40/30; G06F 3/167; G06F 16/2423; G06F 16/24522; G06F 16/24564; G06F 16/24575; G06F 16/248; G06F 16/313;
(Continued)

(56) References Cited

U.S. PATENT DOCUMENTS

| | | | | |
|---|---|---|---|---|
| 6,014,665 A | * | 1/2000 | Culliss | G06F 16/338 |
| | | | | 707/999.005 |
| 6,078,916 A | * | 6/2000 | Culliss | G06F 16/951 |
| | | | | 707/999.005 |

(Continued)

OTHER PUBLICATIONS

"View Live Transcription in a Teams Meeting", Retrieved from: https://support.microsoft.com/en-us/office/view-live-transcription-in-a-teams-meeting-dc1a8f23-2e20-4684-885e-2152e06a4a8b, Mar. 15, 2021, 7 Pages.

(Continued)

*Primary Examiner* — Gerald Gauthier

(57) ABSTRACT

Systems and methods for surfacing natural language queries from one or more transcripts. An example method may include converting received audio to text, through automated speech recognition, to form a transcript of the audio, wherein the transcript includes text of the audio and identifications of speakers associated with portions of the text corresponding to utterances from the respective speakers; generating input signals based on at least the transcript; executing at least one of one or more heuristics or a trained machine-learning (ML) model, using the generated input signals as an input, to generate at least one of a suggested natural language query for searching the transcript or a key moment within the received audio; and causing at least one of the suggested natural language query or the key moment to be surfaced on one or more remote devices.

20 Claims, 9 Drawing Sheets

(51) Int. Cl.
  *G06F 16/332*  (2019.01)
  *G06F 40/295*  (2020.01)
  *G06F 40/30*   (2020.01)
  *G06F 3/0481*  (2022.01)
  *G06F 3/0484*  (2022.01)
  *G10L 17/22*   (2013.01)
  *G10L 25/57*   (2013.01)
  *H04N 7/15*    (2006.01)

(52) U.S. Cl.
  CPC ........ *G06F 16/3329* (2019.01); *G06F 40/295* (2020.01); *G06F 40/30* (2020.01); *G10L 17/22* (2013.01); *G10L 25/57* (2013.01); *H04N 7/15* (2013.01)

(58) Field of Classification Search
  CPC ............. G06F 16/3322; G06F 16/3337; G06F 16/3346; G06F 16/40; G06F 16/70; G06F 16/73; G06F 16/90332; G06F 16/9535; G06F 16/951; G06F 40/166; G06F 40/284; G06F 40/56; G06N 20/00; G06N 5/01; G06N 5/04; G06N 5/045; G06Q 10/087; G06Q 10/107; G06Q 30/0201; G06Q 30/0275; G10L 15/1815; G10L 15/1822; G10L 15/20; G10L 15/26; G10L 15/30; G10L 17/22; G10L 25/57; G10L 15/063; H04L 12/1831; H04M 3/527; H04N 7/15; G01C 21/362; G09B 5/04
  See application file for complete search history.

(56) References Cited

U.S. PATENT DOCUMENTS

| | | | |
|---|---|---|---|
| 6,615,172 B1* | 9/2003 | Bennett | G06F 16/374 704/E15.047 |
| 7,979,415 B2 | 7/2011 | Shen et al. | |
| 8,983,995 B2* | 3/2015 | Hsu | G06F 16/3322 705/26.7 |
| 9,058,362 B2 | 6/2015 | Vijayaraghavan et al. | |
| 9,449,080 B1* | 9/2016 | Zhang | G06F 16/3346 |
| 9,703,868 B2* | 7/2017 | Ramsey | G06F 16/951 |
| 9,715,233 B1* | 7/2017 | Mandeville-Clarke | G01C 21/362 |
| 9,824,147 B1* | 11/2017 | Gilliland | G06F 16/3337 |
| 10,402,419 B1* | 9/2019 | Rubinstein | G06F 16/24575 |
| 11,095,468 B1* | 8/2021 | Pandey | H04L 12/1831 |
| 2004/0117189 A1* | 6/2004 | Bennett | G10L 15/30 704/E15.04 |
| 2007/0192085 A1* | 8/2007 | Roulland | G06F 16/3329 704/9 |
| 2009/0249198 A1* | 10/2009 | Davis | G06F 40/284 715/261 |
| 2009/0327236 A1* | 12/2009 | Denney | G06F 16/70 |
| 2012/0047135 A1* | 2/2012 | Hansson | G06Q 30/0275 707/E17.084 |
| 2012/0150972 A1* | 6/2012 | Morris | G06F 16/248 707/765 |
| 2012/0159377 A1* | 6/2012 | Naranjo | G06F 3/0481 715/780 |
| 2013/0262104 A1* | 10/2013 | Makhija | G06Q 10/087 704/235 |
| 2013/0262107 A1* | 10/2013 | Bernard | G06F 16/3329 704/235 |
| 2014/0040244 A1* | 2/2014 | Rubinstein | G06F 16/2423 707/722 |
| 2014/0074466 A1* | 3/2014 | Sharifi | G10L 15/1815 704/235 |
| 2014/0156693 A1* | 6/2014 | Kritt | G06F 16/73 707/767 |
| 2014/0278405 A1* | 9/2014 | Peters | G10L 15/1822 704/235 |
| 2014/0330857 A1* | 11/2014 | Hunter | G06F 16/951 707/767 |
| 2015/0106091 A1* | 4/2015 | Wetjen | G10L 15/26 704/235 |
| 2015/0331950 A1* | 11/2015 | Zhaung | G06F 16/9535 707/706 |
| 2016/0004706 A1* | 1/2016 | Faghihi Rezaei | G06F 16/3322 707/706 |
| 2016/0171050 A1* | 6/2016 | Das | G06F 16/90332 707/718 |
| 2016/0342597 A1* | 11/2016 | Azzam | G06F 16/24522 |
| 2016/0357830 A1* | 12/2016 | Hornkvist | G10L 15/1815 |
| 2016/0357853 A1* | 12/2016 | Moore | G06F 16/3344 |
| 2017/0098159 A1* | 4/2017 | Sharifi | G06F 3/0481 |
| 2017/0262501 A1* | 9/2017 | Namboodiri | G06F 16/2433 |
| 2018/0081964 A1* | 3/2018 | Su | G06F 16/313 |
| 2018/0189338 A1* | 7/2018 | Kim | G06F 40/166 |
| 2018/0218734 A1 | 8/2018 | Somech et al. | |
| 2018/0341682 A1* | 11/2018 | Shukla | G06F 16/24564 |
| 2018/0357305 A1* | 12/2018 | Kinast | G06F 16/338 |
| 2019/0042645 A1* | 2/2019 | Othmer | G06Q 10/107 |
| 2019/0243831 A1* | 8/2019 | Rumiantsau | G10L 15/26 |
| 2019/0259377 A1 | 8/2019 | Mertens et al. | |
| 2019/0286676 A1* | 9/2019 | Fatzinger | G06F 40/56 |
| 2020/0243095 A1* | 7/2020 | Adlersberg | G06F 40/216 |
| 2020/0279567 A1* | 9/2020 | Adlersberg | G06F 40/35 |
| 2021/0089724 A1* | 3/2021 | Luong | G06N 5/04 |
| 2021/0191938 A1* | 6/2021 | Galitsky | G06N 5/01 |
| 2021/0191988 A1* | 6/2021 | Galitsky | G06F 40/295 |
| 2021/0287683 A1* | 9/2021 | Nareddy | G06N 20/00 |
| 2022/0036376 A1* | 2/2022 | Wichman | G06Q 30/0201 |
| 2022/0093101 A1* | 3/2022 | Krishnan | G10L 15/20 |
| 2023/0013581 A1* | 1/2023 | Nowak-Przygodzki | H04M 3/527 |
| 2023/0115098 A1* | 4/2023 | Miller | G06F 3/0484 704/235 |

OTHER PUBLICATIONS

Li, et al., "Suggestions for Fresh Search Queries by Mining Mircoblog Topics", In Proceedings of International Workshop on Behavior and Social Informatics and Computing Journal, Aug. 3, 2013, 6 Pages.

Pallotta, et al., "Summarization and Visualization of Digital Conversations", In Proceedings of the 1st Workshop on Semantic Personalized Information Management, May 18, 2010, 48 Pages.

Pandit, et al., "Keyword Extraction and Clustering for Document Recommendation in Conversations", In International Journal of Advanced Research in Computer and Communication Engineering, vol. 5, Issue 3, Mar. 2016, pp. 737-740.

Vijayasenan, et al., "An Information Theoretic Approach to Speaker Diarization of Meeting Data", In Journal of IEEE Transactions on Audio, Speech, and Language Processing, vol. 17, Issue 7, Jul. 14, 2009, pp. 1-12.

"International Search Report and Written Opinion Issued in PCT Application No. PCT/US22/039352", dated Oct. 18, 2022, 12 Pages.

* cited by examiner

SUGGESTED QUERIES FOR TRANSCRIPT SEARCH

BACKGROUND

As virtual meetings, teleconferences, and virtual presentations have become more prominent, massive amounts of data are being generated in storing recordings of these events. While these recordings provide useful resources to revisit prior meetings or presentations, the ability to find or discover information within these recordings becomes increasingly challenging. Often times, to find portions of meetings, the user is required to listen to or watch entire meeting recordings, which may even require review of recordings across multiple days or weeks to identify the desired information. Such a problem may also exist during a live meeting that is being recorded as a participant cannot easily rewind a live meeting without missing at least a portion of the meeting.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology provides for improved systems and methods for searching transcripts generated from audio, such as during or after a virtual meeting or presentation. Providing a search capability for the transcript may assist in bringing forth desired information or portions of a particular recording. Simple queries, such as exact-match keyword queries, are more familiar to users, but these types of queries produce results that are often less useful—particularly in transcripts where similar conversational words appear frequently. With the present technology, semantic natural-language (NL) queries may be used for searching transcripts.

The present technology surfaces relevant NL queries based on input signals generated during or from the meeting or presentation that is the subject of the recording or the transcription. The surfaced NL queries may be generated live during the meeting, or after the meeting has been concluded. For example, real-time, highly contextual, personalized, relevant search queries that will be presented in the search box based on the transcript. Thus, the capabilities of the NL search are communicated and more likely to be utilized.

The suggested queries may be generated based on an analysis of input signals based on the transcript, interactions from participants during the meeting or presentation, and/or additional participant data. For instance, the input signals may be evaluated by a set of heuristics or a trained machine learning model that triggers the generation of the suggested query. The suggested query may then be surfaced to one or more users or participants of the virtual meeting. Upon selection of the surfaced query, the query may be executed against the transcript and query results may be returned.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1A:
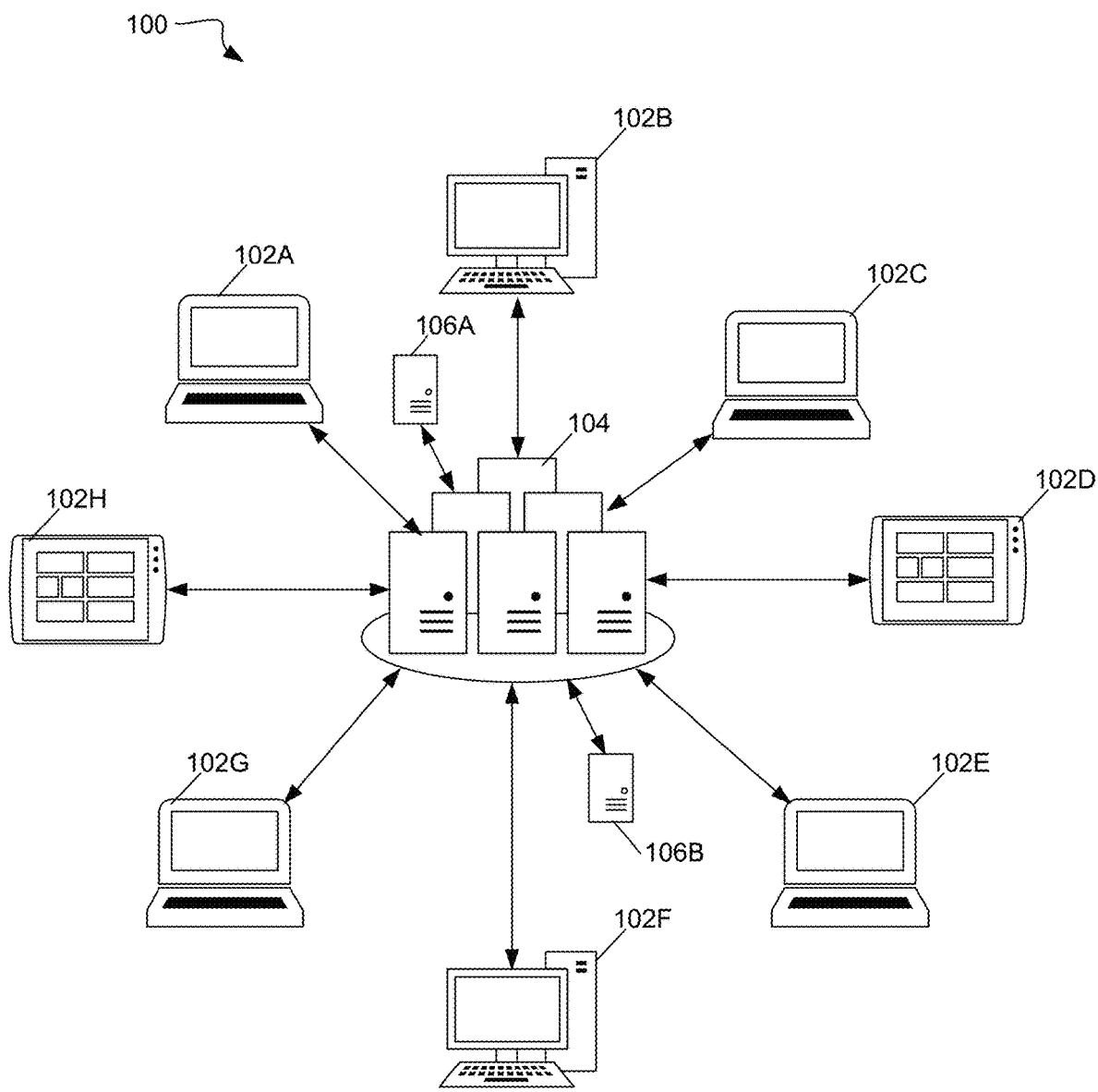
FIG. 1A depicts a system for surfacing queries from one or more transcripts.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

As briefly discussed above, recordings of presentations, meetings, and teleconferences have created massive amounts of data that can be referenced by users, such as participants of the meetings or presentations. While this data provides a good resource for users to reference prior meetings and presentations, it is often difficult to find desired information from the meetings, leading to hours of needless playback of recordings, which becomes not only a waste of human time but a substantial waste of computing resources. For instance, as many of these recordings are stored remotely (such as in a cloud-based storage environment), substantial bandwidth is required to play back or download the high-resolution, large-file-size recordings. In addition, video playback resources may become over utilized and strain both local devices (particularly mobile devices) and/or remote devices providing video-playback resources. Further, when a participant is in a live meeting, the participant cannot easily rewind a recording that is being generated live because (1) the recording may not yet be available and/or (2)

the participant would miss a portion of the live meeting while reviewing a prior portion of the meeting.

As one advancement for recording meetings, speech-to-text technology has allowed for spoken language, such as in a presentation or a meeting, to be converted to text that may be used to generate a transcript for the presentation, meeting, teleconference, etc. This transcription may be performed live in some cases or after a recording has been generated. The transcript may further include the identity of the speakers corresponding to the text blocks as well as time stamps and/or duration indicators. While these transcripts themselves may provide a more useful way to investigate or digest recordings without having to actually playback an entire meeting, the transcript itself may be a long, cumbersome document that does not allow for a quick or efficient review.

Providing a search capability for the transcript assists in bringing forth desired information or portions of a particular recording. Simple queries, such as exact-match keyword queries, are more familiar to users, but these types of queries produce results that are often less useful—particularly in transcripts where similar conversational words appear frequently. With the present technology, semantic natural-language (NL) queries may be used for searching transcripts. These NL queries provide a more robust process to more accurately identify information within the transcript while also providing an improved user experience (UX) environment to the user by allowing for natural language to be utilized. Even with the NL querying capability, there is a challenge in presenting the extent of such capabilities to users—leading to wasted computing resources and under-utilization of querying features with improved performance.

To alleviate the under-utilization problem that results in wasted computing resources and inadequate data discovery in the transcripts, the present technology surfaces relevant NL queries based on input signals generated during, or from, the meeting or presentation that is the subject of the recording or the transcription. The surfaced NL queries may be generated live during the meeting or after the meeting has been concluded. For example, real-time, highly contextual, personalized, relevant search queries that will be presented in the search box based on the transcript. Thus, the capabilities of the NL search are communicated and more likely to be utilized.

FIG. 1 depicts a system 100 for surfacing NL queries from one or more transcripts. The system 100 includes a plurality of client devices 102A-G. The client devices 102A-H may each be associated with, or used, by a user or participant of a virtual meeting. For example, a first user/participant may be associated with a first client device 102A, a second user/participant may be associated with a second client device 102B, and a third user/participant may be associated with a third client device 102C. The client devices 102A-H may take a variety of forms, including desktop computers, laptops, tablets, smart phones, etc. Each of the client devices 102A-H may include software and/or installed applications to allow for participation in, or connection to, a virtual meeting or teleconference. The application may be local application for teleconferencing or virtual meetings. In other examples, the virtual meetings may be accessed via a web browser installed on the respective client device 102A-H.

When participating in a virtual meeting or teleconference, the client devices 102A-H may communicate with one or more remote servers 104 that facilitate the virtual meeting. The The remote device or server 104 may provide a cloud-based service that serves as a virtual meeting platform. During the virtual meeting audio and/or video is communicated between the client devices 102A-H and the server 104. For instance, when the first user speaks into a microphone of the first client device 102A during a virtual meeting (and is not muted), the client device 102A transmits the corresponding audio to the server 104. The server 104 may combine the received audio from the client devices 102A-H and provide the combined audio to each of the client devices 102A-H participating in the virtual meeting. Similar processes may be performed for video data. For example, the cameras of the client devices 102A-H may capture video of the respective user and provide that video stream to the server 104.

During the virtual meeting, one or more participants my also share content such as slide-based presentations. The shared content may also be transmitted from the respective client device 102A-H to the server 104. The server 104 may analyze the content and/or store at least a portion of the content shared during the virtual meeting. The server may also extract additional data or information from the content, such as the title of the content, the file name, or other text from the content.

The audio, video, and/or content from the client devices 102A-H is received by server 104 may also be tagged with the particular client device 102A-H or particular user from which the audio was received. For example, the server 104 is able to tag or label audio associated with the first user or the first client device 102A and also tag or label audio associated with the second user or the second client device 102B such that the two audio streams may be distinguished from one another.

The server 104 may process the received audio streams to generate a transcript of the virtual meeting. For example, the server 104 may perform an automated speech recognition (ASR) process or algorithm to generate text from the received audio streams. The text may be divided and labeled based on the user or client device 102A-H from which the audio stream was received. For instance, text in the transcript that resulted from an audio stream from the first client device 102A may be labeled or tagged with an identifier of the first user or participant of the virtual meeting.

Timestamps and or time durations may also be incorporated into the transcript. For instance, timestamps according to when the corresponding audio was received/spoken may be included in the transcript. Based on the timestamps, speaking durations for utterances of participants (represented as blocks of text in the transcript) may be determined or calculated. The speaking durations may also be incorporated or presented in the transcript. The text generated from the conversion of the audio may then be concatenated together to form a transcript of the virtual meeting.

The transcript may also be generated live (e.g., in real time) during the virtual meeting. For instance, the ASR processing may be performed on the audio streams as they are received by the server 104 (or within a short timeframe from receipt, such as less than 10 seconds). The live transcript may be displayed to the participants of the meeting at each of the respective client devices 102A-G. For example, as the transcript is being generated by the server 104, the server 104 transmits the updates to the transcript as they generated. In other examples, the transcript may be generated after the conclusion of the virtual meeting.

Figure 1B:
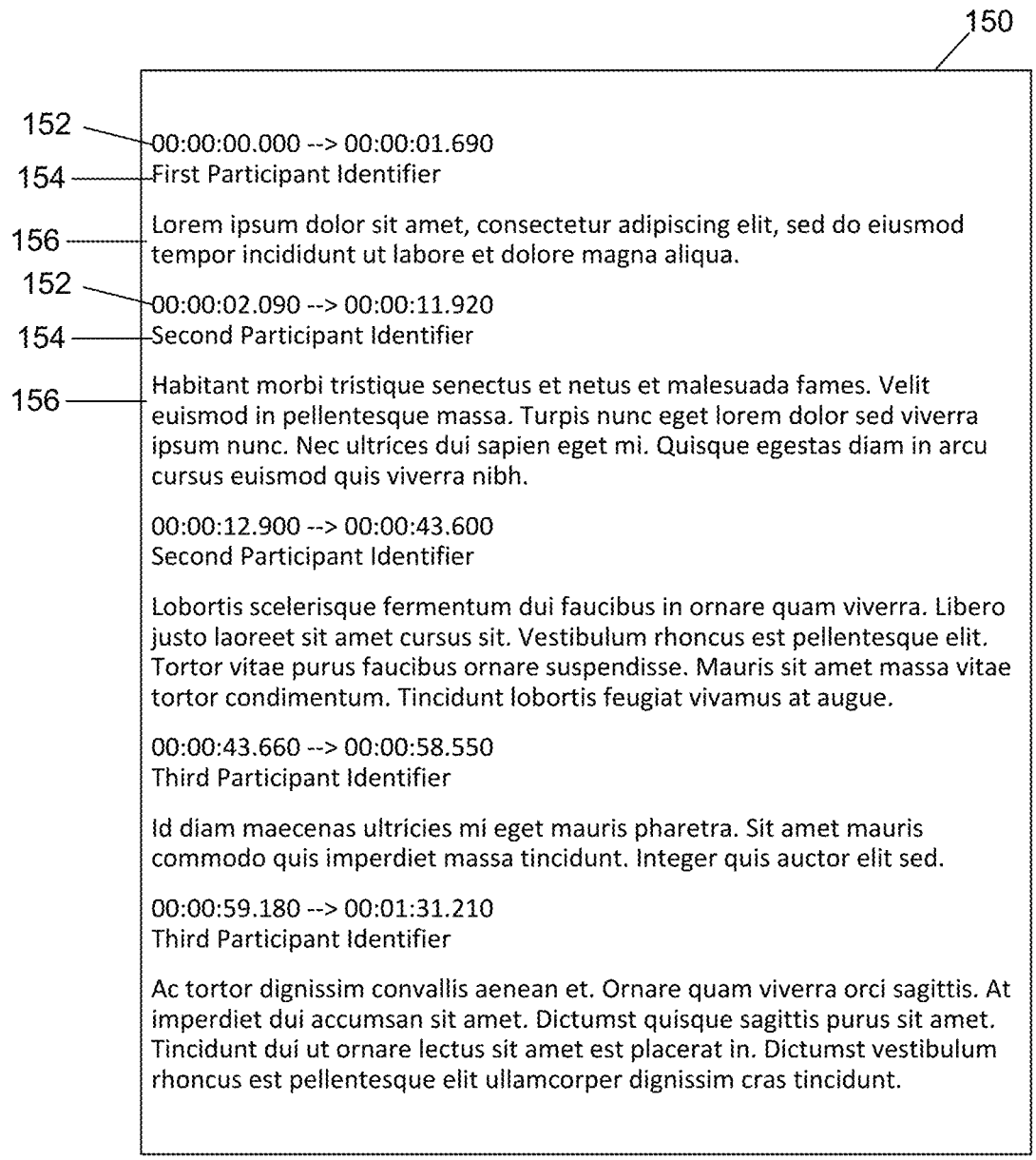
FIG. 1B depicts a portion of an example transcript.

A portion of an example transcript 150 is depicted in FIG. 1B. The example transcript 150 includes multiple text blocks 156 corresponding to utterances of participants of the virtual meeting for which the transcript 150 corresponds. Each text block 156 may include a participant identifier 154 that identifies the participant that uttered the following text block 156. Each text block 156 may also include a time stamp or duration indicator 152 that indicates the time at which the corresponding utterance was spoken and/or the duration of the utterance. New text blocks 156 may be generated when the speaker changes and/or when a speaker has a pause in speaking.

Returning to FIG. 1A, additional data may also be received and tracked by the server 104. As an example, during some virtual meetings, a text-based chat feature is provided that allows participants to provide text-based messages. The messages received in the chat feature may be recorded or persisted by the server 104 along with timestamps and identifications of the participants that provided the respective chat messages. As such, correlations between the chat messages and the text from the transcript may be identified by the server 104. Reactions to chat messages may also be tracked or persisted by the server 104. For example, participants of the meeting may provide reactions to a chat message by selecting the chat message and then selecting a reaction, such as a like, dislike, applause, love, laughing, shock, excitement, surprise, sad, angry, etc. These chat-message reactions may be stored with the respective chat message from which they were received. The chat-message reactions may also include timestamps and/or identifiers for the corresponding participants that provided the chat-message reactions.

In addition, during some virtual meetings, live reactions may be provided by the participants. The live reactions may include the same type of reactions as the chat-message reactions, such as a like, dislike, applause, love, laughing, shock, excitement, surprise, sad, angry, etc. Unlike the chat-message reactions, the live reactions are not tied to a particular chat message. Rather, the live reactions are displayed in the video feed of the virtual meeting. The live reactions may be stored by the server along with a timestamp and a participant identifier for the participant that provided the particular live reaction.

In some examples, the virtual meetings discussed herein may also have an in-person component, such as multiple participants physically present in the same room or in an audience of a presentation. In those examples, applause may be detected from an analysis of the audio stream and/or video stream received from the live location(s). For instance, the audio stream may include a percussive pattern having a frequency consisting with clapping or applause. Other physical actions, such as hand raises, may also be analyzed from a video stream of the live locations. Such in-person live reactions may also be used as input signals for the ML model(s) and heuristics described herein.

Other reactions may be determined from the utterances of the participants of the meeting. For instance, a semantic analysis of the utterances in the text of the transcript may indicate that multiple participants have vocalized strong reactions at some point in the virtual meeting. Sentiment of utterances may also be determined from an analysis of the transcript and/or the audio corresponding to the utterance. The sentiment analysis may be performed, for example, using a text-mining ML or artificial intelligence (AI) tool, such as Text Analytics from the Cognitive Services of the Microsoft AZURE platform.

If a number of such strong reactions exceeds a reaction-count threshold within a set time period, a corresponding suggested query is generated. The reaction-count threshold may be based on the number of participants, and may be expressed as a fraction or percentage of the number of participants. In addition, the time period may be based on empirical data from analysis of prior meetings to determine the timespan at which reactions occur and are still related to a particular time point in the meeting.

The server 104 may also access additional data regarding the participants of the meeting. Such participant data may be stored locally on the server 104, stored on one or more of the client devices 102A-H, and/or stored on one more additional data servers 106A-B that are in communication with the server 104. The additional data regarding the participants may include hierarchy information within a business or company. Such hierarchy information may include a participant's colleagues and their respective positions and relationships. The hierarchy may indicate which participants may report to other participants (e.g., an indication of a participant's supervisor). Other participant data may indicate a position within a social or professional network, such as the LINKEDIN professional network. Such data may indicate a participant's relationship to others, such as first/direct connection, a second connection, a third connection, etc.

The server 104 may generate input signals from the data that the server 104 received or generated. The input signals represent different information or data regarding the virtual meeting, and the input signals are utilized by heuristics or machine-learning (ML) models to generate suggested natural language queries that are ultimately surfaced on one or more of the client devices 102A-H. For instance, if input signals satisfy a set of heuristics, the generation of a particular suggested query is triggered. The input signals may include signals such as the text of the transcript, audio corresponding to the text of the transcript, speaker identification for utterances in the transcript, durations of utterances, sentiment of an utterance, title of the speaker, hierarchy level of the speaker, relationship of the speaker to a user, a relationship of a speaker to other speakers in the virtual meeting, the participants of the virtual meeting, a title of the virtual meeting, a duration of the meeting, chat entries for the virtual meeting, live reactions received during the meeting, reactions to a chat entry, or content presented during the virtual meeting, among other possible input signals.

Figure 2:
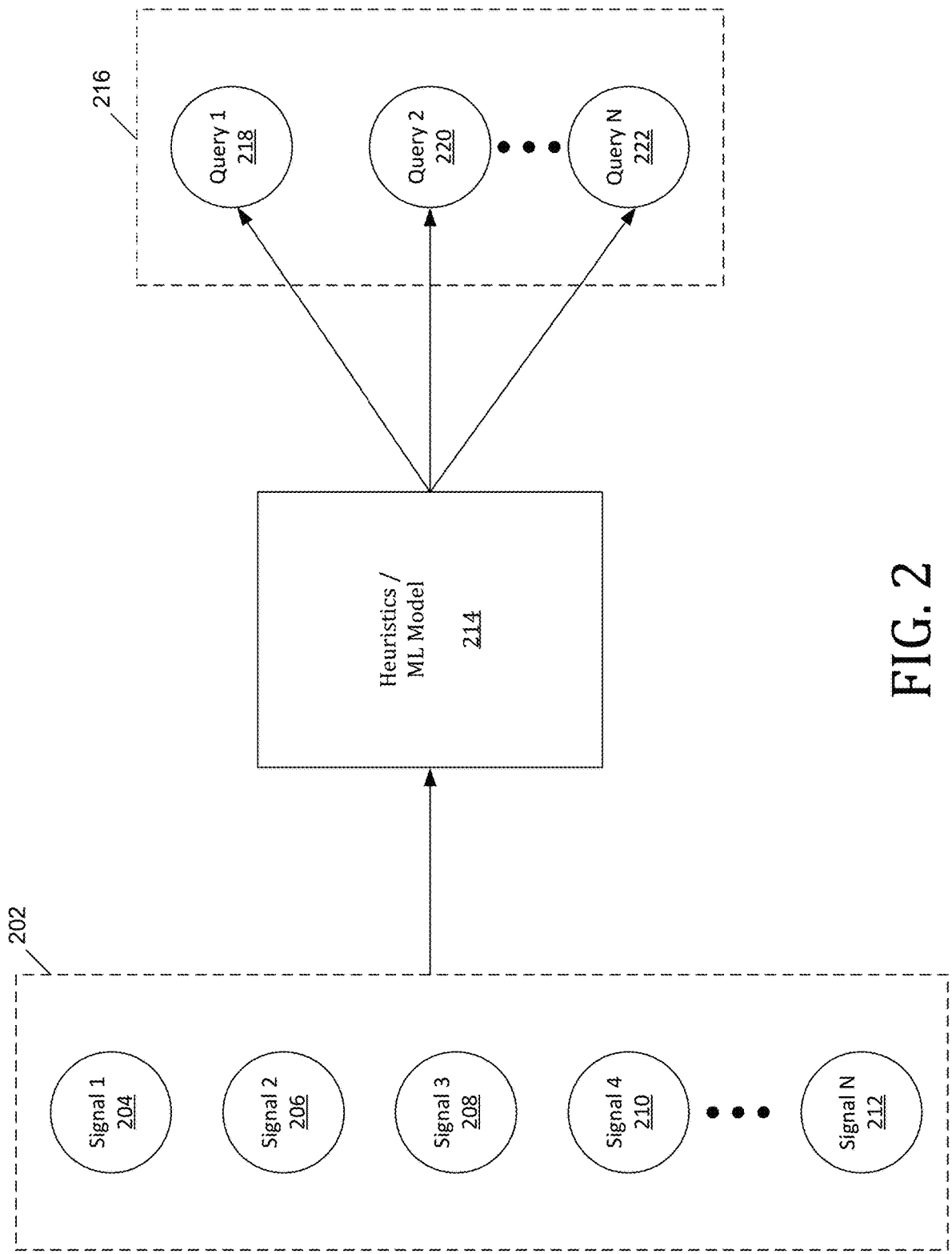
FIG. 2 depicts an example system for surfacing queries from one or more transcripts.

FIG. 2 depicts an example system 200 for surfacing NL queries from one or more transcripts. In some examples, the system 200 may be part of the server 104. The system 200 includes a set of input signals 202. The input signals 202 may include a first input signal 204, a second input signal 206, a third input signal 208, a fourth input signal 210, up to a nth input signal 212. The input signals may include any of the input signals discussed herein, such as the input signals discussed above with respect to FIG. 0.1A.

The input signals 202 are provided as input to a set of heuristics and/or a trained ML model 214. The heuristics and/or ML model 214 processes the input signals 202 to generate one or more suggested natural language search queries 216 for searching the transcript. The suggested queries 216 may include a first query 218 and a second query 220 through an nth query 222. The generated search queries 216 may then be surfaced on one or more client devices, as discussed further herein.

The heuristics and/or ML model 214 may be generated for particular scenarios and/or be automatically generated based on identified patterns in prior interactions from users or participants in previous virtual meetings. The identified patterns may not be unique to a particular set of participants. Rather, the patterns may be applicable to many different participants, and thus may be used to train the ML model 214.

The heuristics may define a set of thresholds of conditions of particular signals that cause an action to be performed and/or a query to be generated for surfacing. For instance, when the input signals 202 satisfy the heuristics 214, the generation one or more suggested queries 216 is triggered.

One example set of heuristics may include speaker-duration heuristics that may be based on the identity of the speaker and/or the duration of an utterance by the speaker. As an example, the speaker-duration heuristics may include a first heuristic based on the title and/or hierarchy of the speaker. For instance, if the speaker has a title or hierarchy above a hierarchy threshold, then that particular heuristic is satisfied. As another example, if an utterance of the speaker has a duration that is greater than an utterance-duration threshold, that particular heuristic is also satisfied. An utterance for duration determinations may include an uninterrupted speaking portion by a single speaker. In other examples, an utterance may include a continuous speaking portion by a single speaker that includes interruptions from other participants where interruptions are short (e.g., below an interruption duration threshold).

In assessing the duration of an utterance, pleasantries, trivial, and/or non-informative content may be filtered out of the transcript signal or otherwise ignored. For example, off-topic discussions, such as introductory conversations about the weather, may not be included in assessing an utterance durance. Such non-informative content may be identified by performing a semantic analysis on the text on the utterance to determine the topic of the text. If the topic does not match a topic for the virtual meeting, which may be determined from the title of the meeting, content shared in the meeting or other signals, the text may be considered as non-informative content. Such non-informative content may not be considered for assessing a duration-based heuristic.

Where both the hierarchy and duration heuristics are satisfied, a suggested natural language query may be generated regarding what the speaker said during the utterance. For instance, if the speaker's name was Nitin, the generated suggested query may be "What did Nitin say?" In some examples, the technology may also identify a topic of the utterance from the speaker. Such identification of the topic may be generated from a semantic analysis of the utterance, natural language processing of the utterance, inverse document frequency, among other topic identification algorithms and processes. The topic may also be identified based on content being shared concurrently with the utterance. In examples where the topic of the utterance is determined, the generated suggested query may include the determined or identified topic. Topic extraction from the text of the transcript may be performed, for example, using natural language processing (NLP) that is capable of identifying important concepts in text, including key phrases and named entities, such as people, events, and organizations. One example of such a technology is the Text Analytics service from the Cognitive Services of the Microsoft AZURE platform. The key phrases and/or extracted entities may be used as a basis for topic identification of an utterance or of the meeting itself. For instance, continuing with the example above, if Nitin had discussed the topic of "hiring," the generated query may be "What did Nitin say about hiring?"

Another example set of heuristics may include reaction-based heuristics. Reaction-based heuristics may be based on reaction-based input signals, such as live reactions, chat-based reactions, or semantic meanings of chat messages. For example, comments in the chat may indicate a strong reaction to a recent statement in the meeting. That reaction may be determined from a semantic analysis of the chat message. For instance, a comment of "Great point Nitin" or "Strongly support!" may indicate a positive, strong reaction to a discussion occurring when the chat message is entered into the chat.

A count of reactions (e.g., likes) to the chat message may also be indicative of a strong reaction to a discussion occurring when the chat message was entered into the chat. Similarly, a count of live reactions received within a short timeframe may also indicate a strong reaction to what is being discussed at that moment. Based on reactions and/or semantic determination of a chat message exceeding a reaction threshold, a key moment or highlight of the meeting may be identified corresponding the moment when or near the chat message was entered and a corresponding suggested query may be generated. For example, the suggested search query may be "What was a meeting highlight?" or "What was a meeting key moment?"

Another example set of heuristics may include identification-based heuristics that are based on the utterances of names during the meeting. The text of the transcript may be semantically analyzed to identify the utterance of a name of a person by a participant of the virtual meeting. The uttered name may be of another participant of the meeting or a person that has some relationship or connection to a participant of the meeting, such as a connection via a company hierarchy or a professional network. A suggested query based on the uttered name may then be generated. For example, the suggested query may be "What did they say about Nitin?" or "When did they talk about me?," where the suggested query is specifically for the user whose name was uttered. The suggested query may only be surfaced for the users whose name was uttered or for users have a sufficient connection to the person whose name was uttered (e.g., a connection that is greater than a connection threshold). For example, if the uttered name is that of the user or a first connection to a user, the suggested query may be surfaced to that particular user. As another example, if the uttered name is a direct supervisor or a direct report of a user, the suggested query may be surface to that particular user.

Another example set of heuristics may include content-based heuristics that are based on the content that is presented or shared during the virtual meeting. As discussed above, during a virtual meeting, one or more participants may share content, such as a slide-based presentation. The present technology may analyze the text or other items within the shared content to determine suggestions for queries. For example, the title of a slide and/or the text of slide in combination with the time during the meeting at which the slide was presented/shared may indicate a topic that is being discussed at that point in the meeting. The identified topic may be reinforced through other topic identification processes based on the analysis of the utterances spoken at or near the time the content was shared. A suggested query may then be generated based on the identified topic from the content and/or the analysis of the utterances. For example, where a slide includes a title of "Budget," a suggested query may be "What was said about the budget?"

Alternatively or additionally, an ML model 214 may be utilized to generate the suggested queries 216 from the input signals 202. The ML model 214 may be trained from known pairs or input signals and queries, which may be extracted from patterns identified from interactions of participants in prior virtual meetings, as discussed further herein.

The heuristics and/or ML model 214 may be executed or processed on a continuous or interval basis during the virtual meeting to generate suggested queries while the virtual meeting is still in progress. In some examples, the heuristics and/or ML model 214 may be executed or processed after the virtual meeting to generate suggested queries for searching a transcript of a completed virtual meeting.

Figure 3A:
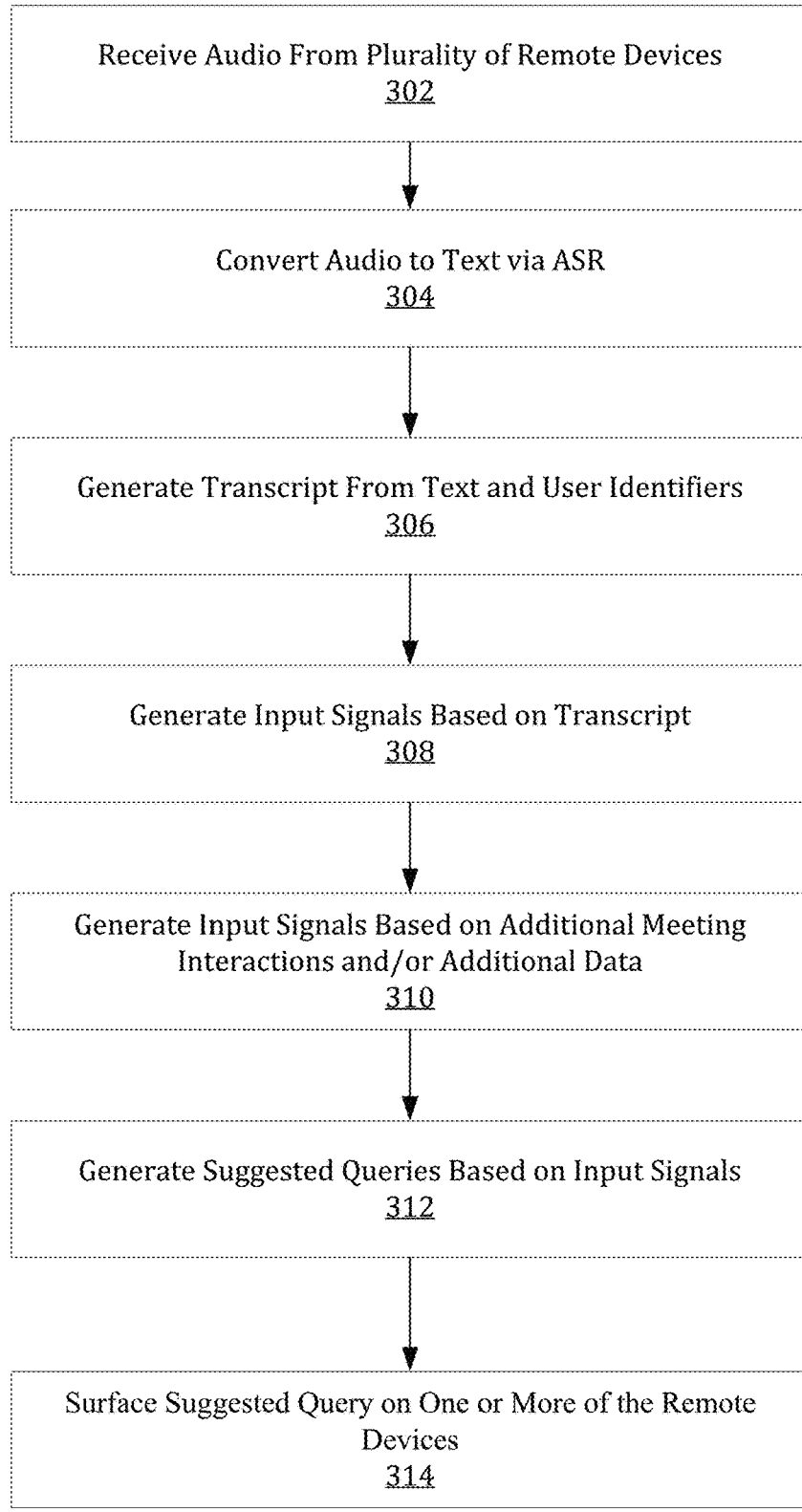
FIG. 3A depicts an example method for surfacing queries from or more transcripts.

FIG. 3A depicts an example method 300 for surfacing queries from or more transcripts. The operations of method 300 may be performed by one or more computing devices, such as a computing device that is facilitating a virtual meeting. For example, the method may be performed by the one or more servers 104 depicted in FIG. 1A. The method 300 may be performed during a virtual meeting and/or after the conclusion of the virtual meeting.

At operation 302, audio is received from a plurality of remote devices. For example, devices associated with different participants of a virtual meeting may transmit the audio captured by respective microphones to a server that is facilitating the virtual meeting. At operation 304, the received audio is converted to text using automated speech recognition. Thus, the conversion of speech to text may be performed substantially in real time to allow for analysis of the text corresponding to the speech concurrently with the virtual meeting.

At operation 306, a transcript is generated from the text that was produced in operation 304. The transcript may be similar to the transcript 150 depicted in FIG. 1B. For instance, the transcript may include user or participant identifiers correlated with text generated from audio received from the particular participants. Thus, the transcript includes text of the audio and identifications of the speakers associated the respective portions of the text for which the speaker uttered. The transcript may also include time stamps or duration indicators. In some examples, the operation 306 of generating the transcript is performed concurrently with, or as part of, the text conversion operation 304.

At operation 308, input signals are generated based on the transcript. In some examples, an input signal may include the transcript itself. The transcript may also be continuously augmented in examples where method 300 is being performed during the virtual meeting to provide suggested queries during the meeting. Accordingly, the input signals may also change or be augmented as the virtual meeting progresses. The input signals generated from the transcript may include signals such as speaker identification for utterances in the transcript, durations of utterances, the participants of the virtual meeting, and a duration of the meeting, sentiment of an utterance, among other types of input signals. The input signals generated from the transcript may include performing semantic analyses of the text in the transcript as well to identify entities uttered during the virtual meeting, such as names of participants or others among other types of uttered entities. Natural language processing of the transcript (or portions thereof) may be used to identify entities, such as people, events, and organizations, as discussed above.

Further, generation of the input signals from the transcript may also include filtering or adjusting the transcript based on the topics of the utterances. For instance, the topics of utterances may be identified by performing a semantic analysis on the text on the utterance to determine the topic of the text. Such identification may be done on a sentence-by-sentence analysis, and/or on a different scale, such as an utterance-by-utterance basis. The topic for the meeting may also be determined, such as through an analysis of a larger corpus of the text in the transcript, the title of the meeting, and/or an analysis of content presented during the meeting (e.g., slide titles, slide content, file names, etc.). The topic of the utterance may then be compared to the topic for the meeting, and the portion of the transcript or utterance may be adjusted or filtered based on the comparison. As an example, in generating duration-based input signals, pleasantries, trivial, and/or non-informative content may be filtered out of the transcript signal or otherwise ignored. Such non-informative content may be identified by performing the semantic analysis on the text on the utterance to determine the topic of the text. If the topic of the potential non-informative content does not match or have a logical overlap with the meeting topic, the potential non-informative text may be marked as non-informative text, and the duration-based input signals may be generated by disregarding the marked non-informative text.

At operation 310, additional input signals are generated based on additional meeting interactions and/or additional data. The additional input signals may include signals such as title of the speaker, hierarchy level of the speaker, relationship of the speaker to a user, a relationship of a speaker to other speakers in the virtual meeting, a title of the virtual meeting, chat entries for the virtual meeting, live reactions received during the meeting, reactions to a chat entry, and/or content presented during the virtual meeting.

Speaker-relationship input signals may be generated based on speaker identification and additional data. The additional data may include hierarchy data for the speaker's role within an organization. The hierarchy may indicate which participants may report to other participants (e.g., an indication of a participant's supervisor). Other additional data may indicate a position within a social or professional network, such as the LINKEDIN professional network. Such data may indicate a participant's relationship to others, such as first/direct connection, a second connection, a third connection, etc.

Reaction-based input signals may be generated based on reactions received from participants during the virtual meeting. For instance, chat messages, chat-based reactions, and live reactions may be monitored, and input signals representing such reactions or messages may be generated in operation 310.

Presented-content-based input signals may also be generated that are based on content presented during the virtual meeting. The presented-content-based input signals may be generated through an analysis of the content presented, such as the text of content presented, the title of the presented content, and/or the title of particular portions of the content, such as a slide of the content. The presented-content-based signals may also be generated from performing a semantic analysis or natural language processing of the presented content, such as to extract entities and/or key phrases in the content.

The input signals generated in operation 308 and operation 310 may be generated as a stream of data. For instance, the data stream may be represented as an array of data corresponding to the particular type of input signal. The array of data may include the type of data for the corresponding input signal as well as a time stamp or other index to provide temporal context for the data in the array.

At operation 312, suggested queries are generated based on the input signals generated in operation 308 and/or operation 310. Generating the suggested queries may include executing or processing execute at least one of heuristics or a trained machine-learning (ML) model, using the generated input signals as an input, to generate a suggested query. The suggested queries may be in the form of a natural language query that reads as question in a form that would be naturally asked by a person, rather than simply one or more keywords without any additional context. For instance, the natural language query may include a question word, such as who, what, when, where, or why. The natural language query may also include one or more slots that are filled with one or more entities or topics identified from the transcript or other virtual meeting data. The natural language query may also include additional words that do not form a part of the ultimate query that would be executed against the transcript to produce a query result.

As an example, for the suggested natural language query of "What did Nitin say about hiring?", the natural language query includes the question word of "What" and two slots that have been filled with the entities of "Nitin" and "hiring." The natural language query also includes additional words, such as "did" and "about" that may not form the ultimate query executed against the transcript. Other queries may not be entity-specific. For example, a suggested natural-language query of "What was a meeting highlight?" does not include an extracted entity as part of a query. Rather, the query includes a concept (e.g., highlight) regarding the meeting that was triggered based on the input signals.

In addition, the suggested queries may be generated for all participants of the virtual meeting or a subset thereof. For instance, some queries may be relevant to all of the participants or a larger group of the participants. Such an example query may be "What was a meeting highlight?" Other queries, however, may be specific to one or more particular participants/users. For example, some queries based on speaker-relationship input signals or heuristics may be specific to a particular user. Such an example query may be "What did they say about me?" That example query is specific to one user that corresponds to the "me" of the query.

At operation 314, the suggested query generated in operation 312 is surfaced on one or more of the remote devices corresponding to participants of the virtual meeting. Where the method 300 is performed by a server, operation 314 may cause the suggested query to be surfaced. Causing the suggested query to be surfaced may include sending the suggested query, along with a signal indicating the suggested query is to be surfaced, to one or more of the remote devices. The signal indicating the query is to be surface may also include how the query is to be surfaced. The queries may be surfaced in a variety of manners, such as a pop-up, an auto-complete in an input field, a drop-down display of an input field, or other possibly surfacing options for presenting the suggested query to the user.

Method 300 may continue by receiving a selection of the suggested query (or a query where multiple queries are surfaced). The selection of the query may be based on a selection using an input device, such as a click of a mouse or a touch input on a touch input. The selection of the query may also include an indication to complete the query (e.g., a right arrow or enter input) where the suggested query is surfaced as an auto-complete display in an input field. Upon receiving the selection of the suggested query, the suggested query may be executed against the transcript to generate a query result. The query results may be then be displayed or presented (or caused to be displayed or presented) to the remote device from which the selection was received.

Method 300 may also incorporate operations to facilitate a feedback loop based on engagement or interaction with the suggested queries by users or participants. For example, if users interact or select a particular suggested query within a timeframe after the suggestion of the query, the trained ML model may be reinforced based on the selection and/or a confidence level of the output of the ML model or heuristic application may be improved. In contrast, if users fail to interact with or select the suggested queries, the ML model and/or the heuristics may be modified based on the lack of engagement with the suggested query.

In addition, method 300 may also include generating key topics and/or key moments of the virtual meeting or presentation based on the input signals generated in operation 308 or operation 310. For instance, as discussed above, topics and/or key phrases may be identified from the transcript, using semantic analysis of the text, natural language processing of the text, inverse document frequency, among other topic identification algorithms and processes, such as the text analytics service from the Cognitive Services of the Microsoft AZURE platform. In addition, as also discussed above, key moments or highlights of the meeting may be determined based on the reactions during the virtual meeting, such as chat-based reactions and/or live reactions. A topic that was being discussed at the time of the key moment may be used to generate identifications of a key moments and topics corresponding to the key moments. Such information may be used to generate a summary or recap of the virtual meeting. The summary of the virtual meeting, including the key moments and/or key topics, may be provided along with the transcript and/or may be incorporated into a file of the transcript to provide for quicker identification. In some examples, the key moments and/or key topics may be surfaced as selectable elements. For instance, when a selectable key moment user interface element is selected, the application may automatically navigate to the corresponding time of the key moment in the transcript and/or recording of the meeting or presentation.

Figure 3B:
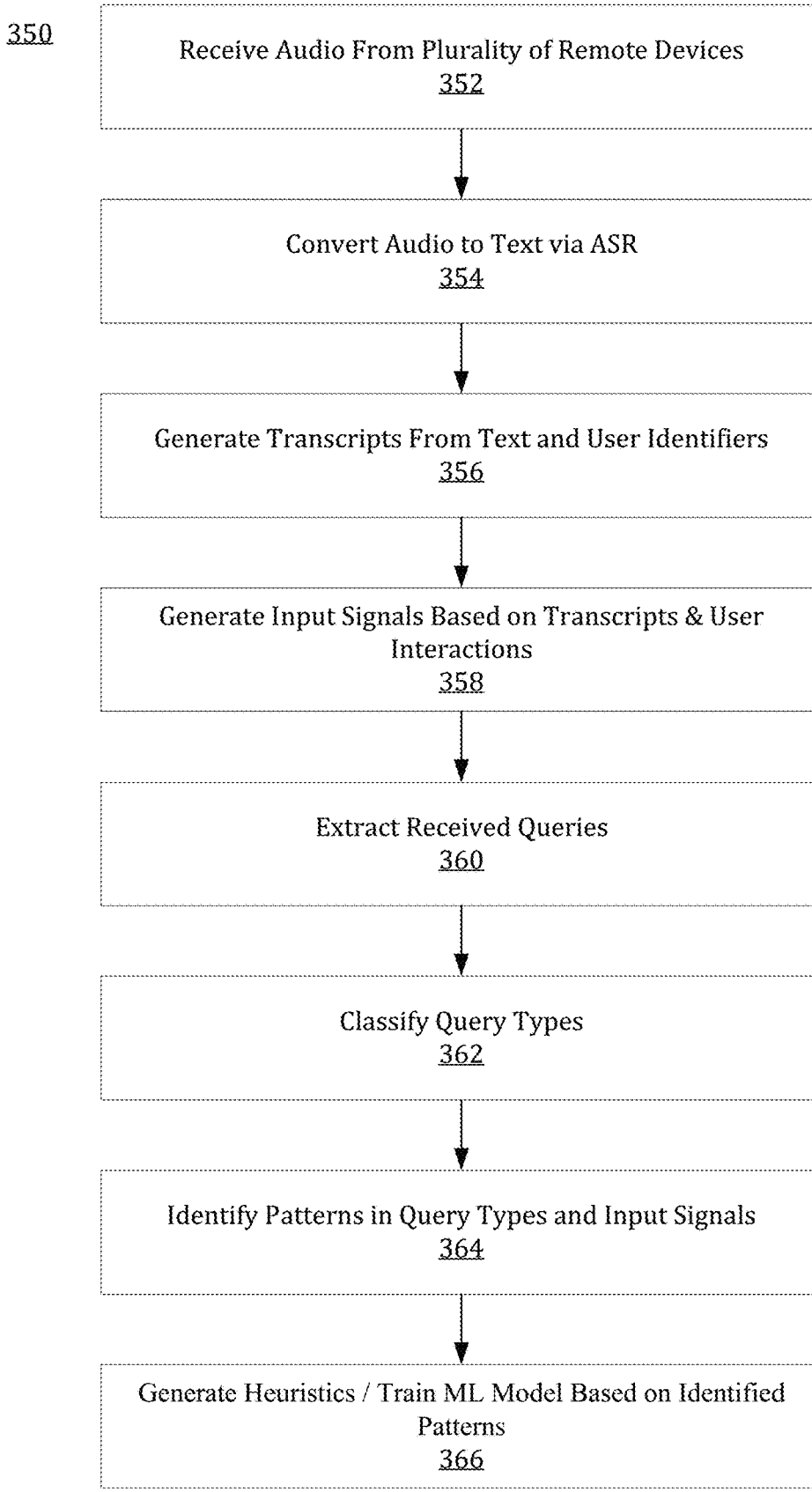
FIG. 3B depicts an example method for extracting queries from transcript interactions.

FIG. 3B depicts an example method 350 for extracting queries from transcript interactions. The operations of method 350 may be performed by one or more computing devices, such as a computing device that is facilitating a virtual meeting. For example, the method may be performed by the one or more servers 104 depicted in FIG. 1A.

At operation 352, audio is received from a plurality of a remote devices. The audio may be received during a plurality of virtual meetings from participants of the prior virtual meetings. The audio received in operation 352 is converted to text in operation 354. The conversion of the audio to text may be performed using automated speech recognition techniques. At operation 356, transcripts for the virtual meetings are generated. Operations 352-356 may be performed during the virtual meetings or after the completion of the virtual meetings.

At operation 358, the transcripts from a plurality of virtual meetings may be accessed, and input signals may be generated from the transcripts. Additional user interactions from the prior virtual meetings along with external or additional data (e.g., hierarchy data, network data) for the prior virtual meetings may also be accessed, and input signals may be generated based on the interactions and data. The generated input signals may include any of the input signals discussed herein.

At operation 360, queries that have been executed against the prior transcripts are extracted. The extracted queries may include queries that have been entered by users or participants of the prior virtual meetings. The queries may have been entered during the virtual meeting or after the virtual meeting. The time at which the query was entered by the user (e.g., a time relative to a virtual meeting) may also be extracted for analysis.

At operation 362, the extracted queries may be classified based on query type. Classification of the query by query type may be performed by identifying the intent of the query. The intent of the query may be identified through natural language processing, and intent of the query may be indicative of the result the query is intended to achieve. For example, one classification of queries may be queries having an intent for querying information or a topic about the meeting, such as "What did Nitin say about the budget?" or "When did Nitin speak?". Another classification may be queries having an intent for querying for specific entities from the meeting, such as "What were the action items from the meeting?" or "What was the meeting outcome?".

At operation 364, patterns are identified between the queries and the input signals across the prior virtual meetings. The patterns may be identified based on the query type as well. For instance, patterns of input signals that result in the generation of particular query types may be generated. The patterns may be identified through multiple potential pattern identifying techniques, such as machine learning algorithms that may perform pattern recognition or clustering, including hierarchical models, k-means clustering algorithms, among others.

Based on the patterns identified in operation 366, a machine learning model may be trained and/or new heuristics may be created for generating suggested queries from input signals. The trained ML model and/or new heuristics may be utilized, for example, as the trained ML model or heuristics 214 in FIG. 2.

Figure 4:
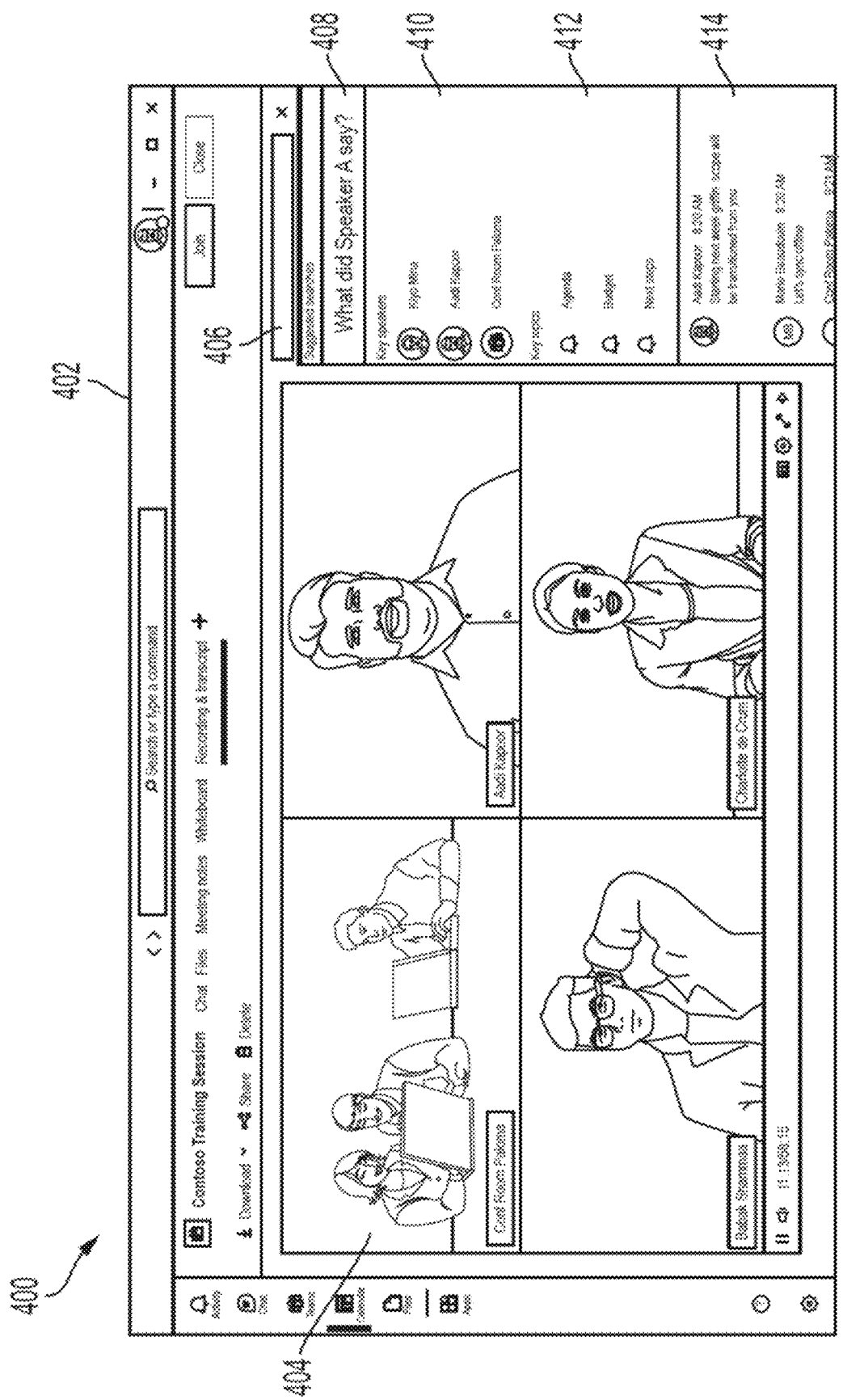
FIG. 4 depicts an example user interface for surfacing suggested queries.

FIG. 4 depicts an example user interface 400 for surfacing suggested queries. The example interface 400 is an interface that also facilitates a virtual meeting, which is a videoconference in the example depicted. The interface 400 includes a window 402 that includes a variety of user interface features for facilitating the videoconference and transcript search functionalities. A plurality of video segments 404 are displayed to show video feeds from the participants of the videoconference. In the videoconference depicted, the participants include a Conference Room Paloma, Aadi Kapoor, Babak Shamaa, and Charlotte de Crum.

In addition to the video segments 404, additional functionality relating to transcript analysis and search is also provided. For example, a live transcript 414 may be displayed in a segment or panel of the user interface 400. The live transcript 414 may include the text corresponding to an utterance, a speaker identification, and a time stamp for when the utterance began. The live transcript 414 may continuously update as audio from the videoconference is converted to text.

A transcript-search input field 406 is also provided for searching the live transcript 406. The transcript-search input field 406 is configured to accept text input in the form a query. When the query is entered into the transcript-search input field 406, a corresponding query may be executed against the live transcript 414, and a result may be returned and displayed in the interface 400.

In the example depicted, a suggested queries/searches segment 408 is displayed adjacent to the transcript-search input field 406. The suggested searches segment 408 displays (e.g., surfaces) the suggested queries that are discussed herein. Upon a selection of a suggested query from the suggested searches segment 408, the selected query may be executed against the live transcript 414, and a query result may be returned. The suggested searches segment 408 may include one or more suggested queries depending on how many queries were generated. In other examples, the suggested queries may be displayed in the transcript-search input field 406 and/or as a popup or other segment of the interface 400.

The interface 400 may include additional insights regarding the virtual meeting that are extracted from the transcript of the virtual meeting. For example, the interface 400 may include a key speakers segment 410 and a key topics segment 412. The key speakers segment 410 may list the key speakers of the virtual meeting. The key speakers may change as the virtual meeting progresses. The key speakers may be identified based on the total speaking duration of the speakers thus far in the virtual meeting. The key speakers may also be based on the hierarchy data of the speakers. For instance, speakers that have a higher hierarchy within an organizational chart for an organization may be more likely to be a key speaker. The key speakers may also be identified based on the relationship to the user for which interface 400 is being presented. For instance, hierarchy or professional network connections of the user may be used to identify key speakers. As an example, the user's direct supervisor may be more likely to be considered a key speaker from the perspective of the user. As such, the key speaker identification may be based on the identification of the user to whom the interface 400 is being presented. Thus, the identification of the key speakers may be based on at least the speaking duration, hierarchy data for the respective speaker, an identity of the user to whom the interface is being displayed, and/or relationship data from social or professional networks. The key speakers in the key speakers segment 410 may also be arranged or ranked based on similar input signals or metrics.

The key topics segment 412 includes key topics that have been discussed thus far in the video conference. The key topics for the meeting may be updated as the meeting progresses and the transcript continues to grow. The key topics may be identified through topic identification techniques discussed herein, such as using a using natural language processing (NLP), which is capable of identifying important concepts in text, including key phrases and named entities, such as people, events, and organizations. One example of such a technology is the Text Analytics service from the Cognitive Services of the Microsoft AZURE platform. The key topics may also be based on an analysis of transcript text within a time window to provide a representation of recent key topics. For example, the text may be continuously analyzed within a time window (e.g., 10 minutes, 20 minutes, etc.) prior to the present time.

In addition to, or as an alternative to, the key topics segment 412, key moments of the meeting may also be displayed in the interface 400. For instance, key moments identified for the meeting as discussed above, may be displayed with a time stamp and/or a topic that was being discussed during that key moment. In some examples, the key moments may be displayed as selectable user interface elements. When a key moment is selected, the transcript 414 is automatically navigated to the time at which the key moment occurred. The video recording may also be automatically navigated to the time at which the key moment occurred, and the video segments 404 update to correspond to the time of the key moment.

Figure 5:
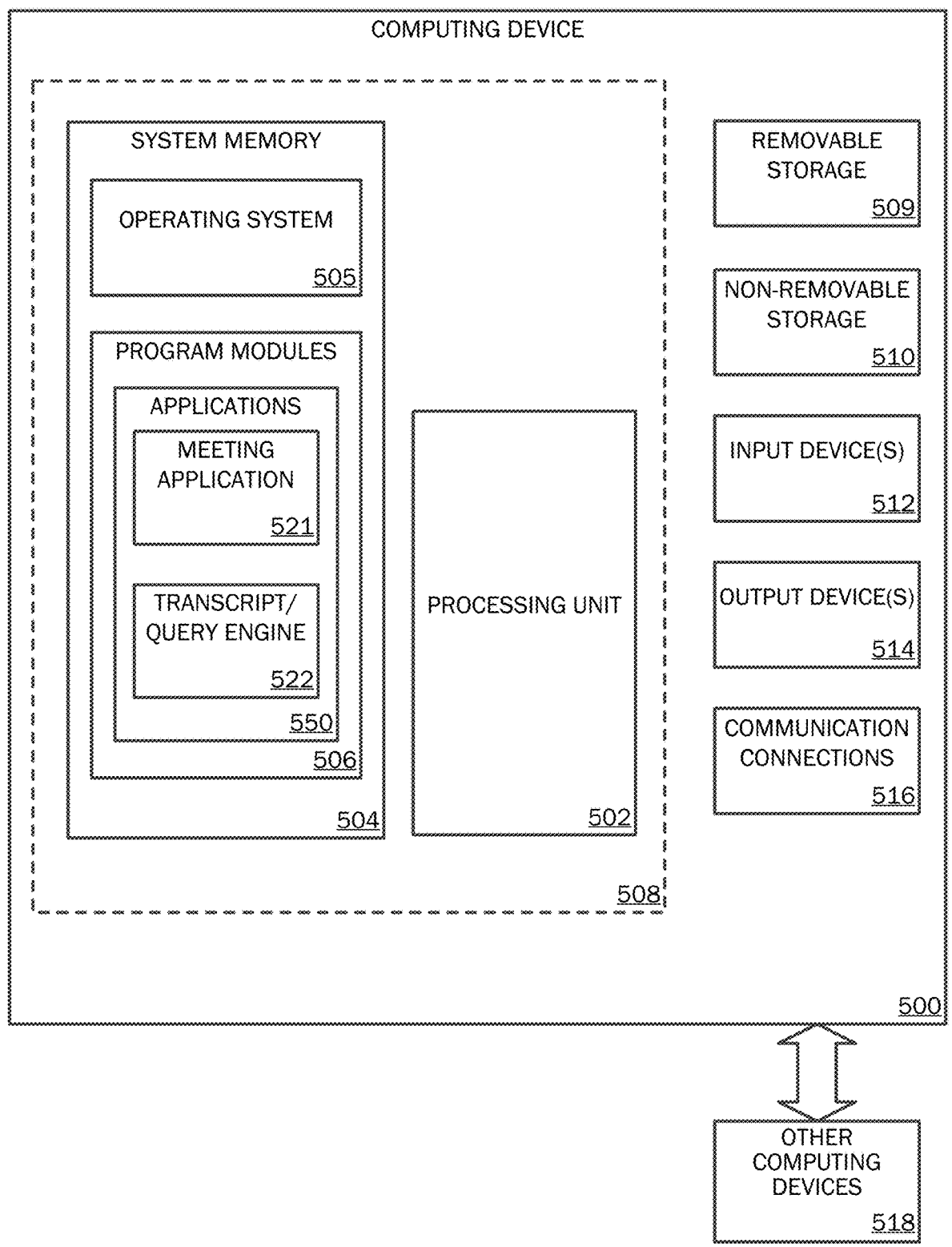
FIG. 5 is a block diagram illustrating example physical components of a computing device with which aspects of the invention may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for the client device 118 described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as a virtual meeting application 521 and/or a transcript/query application 522, which may be the same application in some examples.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the methods 300 and 350 illustrated in FIGS. 3A-3B. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
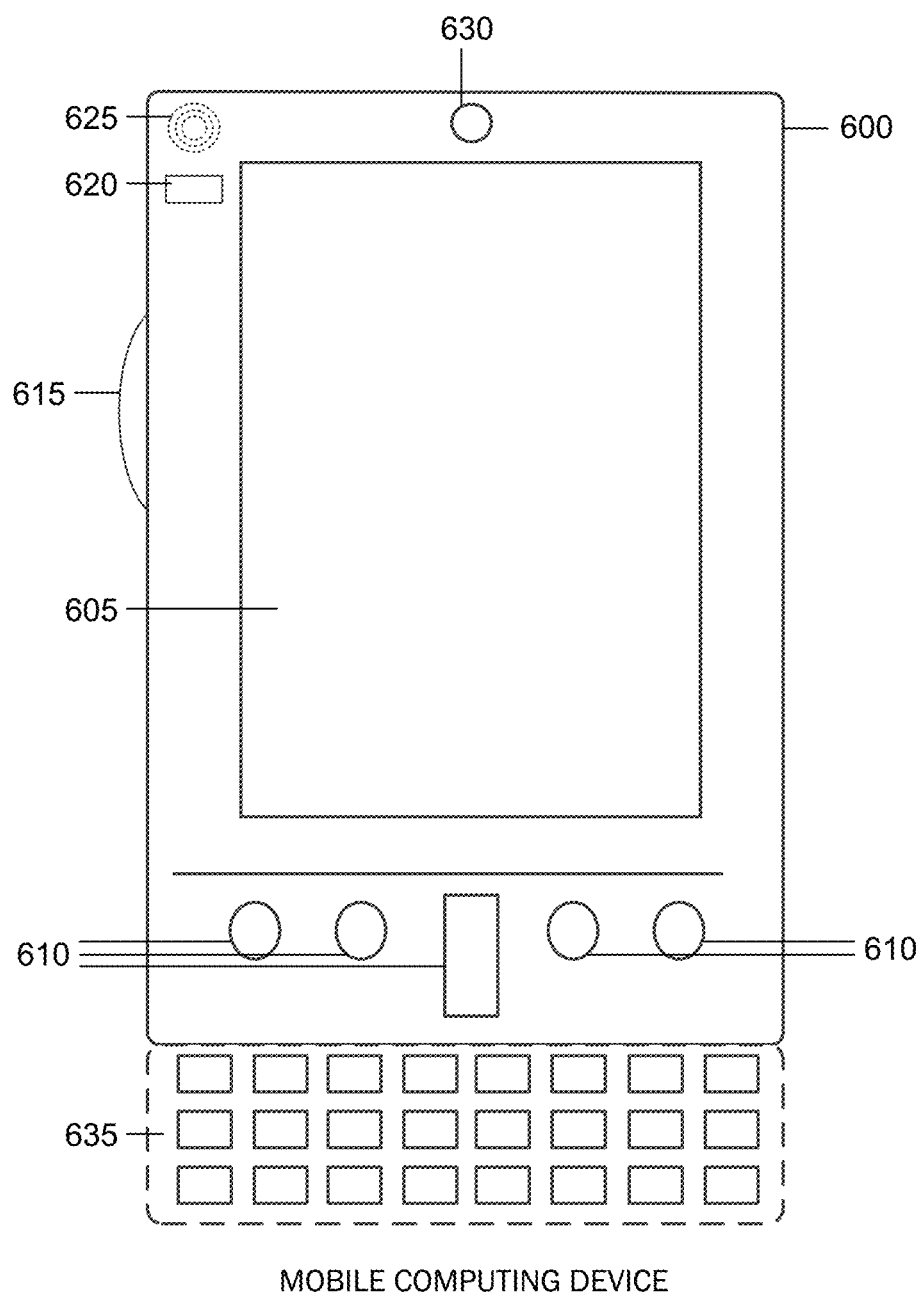
FIGS. 6A and 6B are simplified block diagrams of a mobile computing device with which aspects of the present invention may be practiced.
Figure 6B:
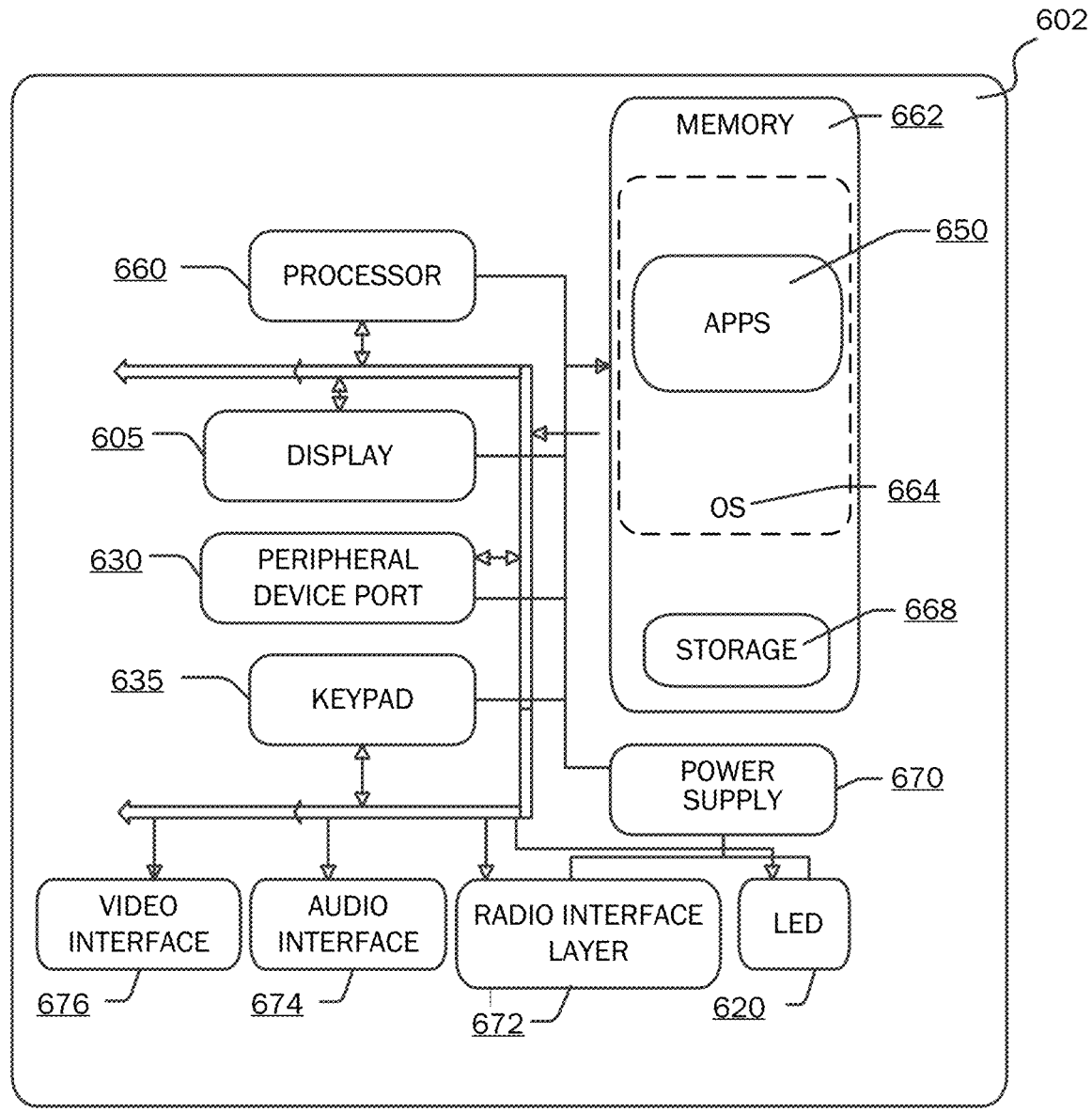

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing at least some aspects of the present technology is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., videoconference or virtual meeting application, browser, e-mail, calendaring, contact managers, messaging clients, games, and media clients/players). In some examples, the system 602 is integrated as a computing device, such as an integrated personal digital assistant (PDA) and wireless phone.

One or more application programs 650 may be loaded into the memory 662 and run on or in association with the operating system 664. Examples of the application programs include videoconference or virtual meeting programs, phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at a remote device or server. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, many technical advantages result from the present technology. For instance, instead of the computing systems requiring full playback of recorded audio or video, the generated queries provide a direct insight into the recording that may eliminate the need for such playback. As a result, CPU resources, GPU resources, and bandwidth resources may also be conserved. The amount of computing resources that are conserved with the present technology also increases with the number of users or participants in the meeting, as each of those users would have otherwise needed to playback the entire recording. Moreover, the generation of key topics provides useful insight that may further prevent a need to playback an entire recording. Rather, if any playback is desired, the playback may be limited to the portions of the recording where the key topics were discussed. In addition, because the generated queries discussed herein are generated from the transcript itself, the generated queries, when executed, will produce results to the query. In contrast, without the suggested queries, the computing systems are required to process random user-submitted queries that may generate no results (e.g., a null result set), which is yet another waste of computing resources.

As will also be understood from the foregoing disclosure, in an aspect, the present technology relates to a system for surfacing natural language queries from one or more transcripts. The system includes at least one processor; and memory storing instructions that, when executed by the at least one processor, cause the system to perform operations. The operations include receive audio associated with different participants of a virtual meeting; convert, through automated speech recognition, the received audio to text to form a transcript of the audio, wherein the transcript includes text of the audio and identifications of speakers associated with portions of the text corresponding to utterances from the respective speakers; generate input signals based on at least the transcript; execute at least one of one or more heuristics or a trained machine-learning (ML) model, using the generated input signals as an input, to generate a suggested natural language query for searching the transcript; and cause the suggested natural language query to be surfaced on one or more remote devices.

In an example, the input signals include at least one of: the text of the transcript, audio corresponding to the text of the transcript, speaker identification for utterances in the transcript, durations of utterances, sentiment of an utterance, a title of a speaker, hierarchy level of a speaker, relationship of a speaker to a user, a relationship of a speaker to other speakers in the virtual meeting, identification of participants of the virtual meeting, a title of the virtual meeting, a duration of the virtual meeting, a chat entry for the virtual meeting, live reactions received during the meeting, reactions to a chat entry, or content presented during the virtual meeting. In another example, an utterance in the transcript has a duration greater than an utterance-duration threshold; a speaker associated with the utterance has a hierarchy level greater than a hierarchy threshold; and the suggested natural language query includes a query regarding what the speaker said in the utterance. In yet another example, the operations further comprise analyze the text of transcript to identify a topic in the transcript; and wherein the suggested natural language query includes the identified topic. In still another example, a chat entry is received during the virtual meeting; the chat entry receives a count of reactions greater than a reaction-count threshold; and the suggested natural language query includes question regarding key moments of the virtual meeting. In still another example, the operations further include performing a semantic analysis of the text of the transcript to identify an uttered name; and the suggested natural language query is based on the uttered name. In still yet another example, wherein the suggested natural language query is surfaced during the virtual meeting.

In another aspect, the present technology relates to a computer-implemented method for surfacing suggested natural language queries from one or more transcripts. The method includes converting received audio to text, through automated speech recognition, to form a transcript of the audio, wherein the transcript includes text of the audio and identifications of speakers associated with portions of the text corresponding to utterances from the respective speakers; generating input signals based on at least the transcript; executing at least one of one or more heuristics or a trained machine-learning (ML) model, using the generated input signals as an input, to generate at least one of a suggested natural language query for searching the transcript or a key moment within the received audio; and causing at least one of the suggested natural language query or the key moment to be surfaced on one or more remote devices.

In an example, the input signals include at least one of: the text of the transcript, audio corresponding to the text of the transcript, speaker identification for utterances in the transcript, durations of utterances, sentiment of an utterance, a title of a speaker, hierarchy level of a speaker, relationship of a speaker to a user, a relationship of a speaker to other speakers in the virtual meeting, identification of participants of the virtual meeting, a title of the virtual meeting, a duration of the virtual meeting, a chat entry for the virtual meeting, live reactions received during the meeting, reactions to a chat entry, or content presented during the virtual meeting. In another example, the participants include a first participant and a second participant, and the method further includes performing a semantic analysis of the text of the transcript to identify an utterance by the second participant of a name of the first participant; and the suggested natural language query is based on the uttered name of the first participant, wherein the suggested natural language query is caused to be surfaced on the remote device of the first participant. In still another example, the natural language query and the key moment are surfaced. In yet another example, the natural language query and the key moment are concurrently surfaced in a videoconference interface during a videoconference. In still yet another example, the videoconference interface includes a plurality of video segments, a transcript-search input field, and at least a portion of the transcript. In a further example, the method includes receiving a selection of the surfaced key moment; and in response to receiving the selection, navigating the video segments to a time point at which the key moment occurred.

In another aspect, the technology relates to a computer-implemented system for surfacing suggested natural language queries from one or more transcripts. The system includes at least one processor; and memory storing instructions that, when executed by the at least one processor, cause the system to perform operations. The operations include access a transcript generated from audio of multiple participants of a virtual meeting, wherein the transcript includes text of the audio and identifications of the speakers associated with the respective portions of the text; generate input signals based on at least the transcript, wherein the input signals include at least two of: the text of the transcript, audio corresponding to the text of the transcript, speaker identification for utterances in the transcript, durations of utterances, sentiment of an utterance, a title of a speaker, hierarchy level of a speaker, relationship of a speaker to a user, a relationship of a speaker to other speakers in the virtual meeting, identification of participants of the virtual meeting, a title of the virtual meeting, a duration of the virtual meeting, a chat entry for the virtual meeting, live reactions received during the meeting, reactions to a chat entry, or content presented during the virtual meeting; execute at least one of one or more heuristics or a trained machine-learning (ML) model, using the generated input signals as an input, to generate a suggested natural language query for searching the transcript; and cause the suggested natural language query to be surfaced on one or more remote devices.

In an example, the operations further include receive a selection of the suggested natural language query; based on receiving the selection of the suggested natural language query, execute the suggested natural language query against the transcript; and generate query results. In another example, the operations further include: cause at least one of key topics or key speakers for the virtual meeting to be surfaced. In still another example, the natural language query and the at least one of the key topics or key speakers are concurrently surfaced within a videoconference interface. In yet another example, generating the input signals includes performing a semantic analysis on the transcript to identify one or more topics of the transcript; and filtering the transcript based on the identified topics. In still yet another example, filtering the transcript causes removal of non-informative content from the transcript for generation of input signals.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A system for surfacing natural language queries from one or more transcripts, the system comprising:
   at least one processor; and
   memory storing instructions that, when executed by the at least one processor, cause the system to perform operations comprising:
      receive audio associated with different participants of a virtual meeting;
      convert, through automated speech recognition, the received audio to text to form a transcript of the audio, wherein the transcript includes text of the audio and identifications of speakers associated with portions of the text corresponding to utterances from the respective speakers;
      generate input signals based on at least the transcript;
      execute at least one of one or more heuristics or a trained machine-learning (ML) model, using the generated input signals as an input, to generate a suggested natural language query for searching the transcript;
      cause the suggested natural language query to be surfaced on one or more remote devices;
      receive a selection of the suggested natural language query;
      based on receiving the selection of the suggested natural language query, execute the suggested natural language query against the transcript; and
      generate query results.

2. The system of claim 1, wherein the input signals include at least one of: the text of the transcript, audio corresponding to the text of the transcript, speaker identification for utterances in the transcript, durations of utterances, sentiment of an utterance, a title of a speaker, hierarchy level of a speaker, relationship of a speaker to a user, a relationship of a speaker to other speakers in the virtual meeting, identification of participants of the virtual meeting, a title of the virtual meeting, a duration of the virtual meeting, a chat entry for the virtual meeting, live reactions received during the meeting, reactions to a chat entry, or content presented during the virtual meeting.

3. The system of claim 1, wherein:
   an utterance in the transcript has a duration greater than an utterance-duration threshold;
   a speaker associated with the utterance has a hierarchy level greater than a hierarchy threshold; and
   the suggested natural language query includes a query regarding what the speaker said in the utterance.

4. The system of claim 1, wherein the operations further comprise:
   analyze the text of transcript to identify a topic in the transcript; and
   wherein the suggested natural language query includes the identified topic.

5. The system of claim 1, wherein:
   a chat entry is received during the virtual meeting;
   the chat entry receives a count of reactions greater than a reaction-count threshold; and
   the suggested natural language query includes question regarding key moments of the virtual meeting.

6. The system of claim 1, wherein the operations further comprise:
   performing a semantic analysis of the text of the transcript to identify an uttered name; and
   the suggested natural language query is based on the uttered name.

7. The system of claim 1, wherein the suggested natural language query is surfaced during the virtual meeting.

8. A computer-implemented method for surfacing suggested natural language queries from one or more transcripts, the method comprising:
   converting received audio to text, through automated speech recognition, to form a transcript of the audio, wherein the transcript includes text of the audio and identifications of speakers associated with portions of the text corresponding to utterances from the respective speakers;
   generating input signals based on at least the transcript;
   performing a semantic analysis of the text of the transcript to identify an utterance, by a first participant, of a name of a second participant;
   executing at least one of one or more heuristics or a trained machine-learning (ML) model, using the generated input signals as an input, to generate at least one of a suggested natural language query for searching the transcript or a key moment within the received audio; and
   causing at least one of the suggested natural language query or the key moment to be surfaced on one or more remote devices, wherein at least one of the suggested natural language query or the key moment is based on the uttered name of the second participant and the at least one of the suggested natural language query or the key moment is caused to be surfaced on the remote device of the second participant.

9. The method of claim 8, wherein the input signals include at least one of: the text of the transcript, audio corresponding to the text of the transcript, speaker identification for utterances in the transcript, durations of utterances, sentiment of an utterance, a title of a speaker, hierarchy level of a speaker, relationship of a speaker to a user, a relationship of a speaker to other speakers in the virtual meeting, identification of participants of the virtual meeting, a title of the virtual meeting, a duration of the virtual meeting, a chat entry for the virtual meeting, live reactions received during the meeting, reactions to a chat entry, or content presented during the virtual meeting.

10. The method of claim 8, wherein the natural language query and the key moment are surfaced.

11. The method of claim 10, wherein the natural language query and the key moment are concurrently surfaced in a videoconference interface during a videoconference.

12. The method of claim 11, wherein the videoconference interface includes a plurality of video segments, a transcript-search input field, and at least a portion of the transcript.

13. The method of claim 12, further comprising:
receiving a selection of the surfaced key moment; and
in response to receiving the selection, navigating the video segments to a time point at which the key moment occurred.

14. The method of claim 8, further comprising:
receiving a selection of the suggested natural language query;
based on receiving the selection of the suggested natural language query, execute the suggested natural language query against the transcript; and
generating query results.

15. A computer-implemented system for surfacing suggested natural language queries from one or more transcripts, the system comprising:
at least one processor; and
memory storing instructions that, when executed by the at least one processor, cause the system to perform operations comprising:
access a transcript generated from audio of multiple participants of a virtual meeting, wherein the transcript includes text of the audio and identifications of the speakers associated with the respective portions of the text;
generate input signals based on at least the transcript, wherein the input signals include at least two of: the text of the transcript, audio corresponding to the text of the transcript, speaker identification for utterances in the transcript, durations of utterances, sentiment of an utterance, a title of a speaker, hierarchy level of a speaker, relationship of a speaker to a user, a relationship of a speaker to other speakers in the virtual meeting, identification of participants of the virtual meeting, a title of the virtual meeting, a duration of the virtual meeting, a chat entry for the virtual meeting, live reactions received during the meeting, reactions to a chat entry, or content presented during the virtual meeting;
execute at least one of one or more heuristics or a trained machine-learning (ML) model, using the generated input signals as an input, to generate a suggested natural language query for searching the transcript;
cause the suggested natural language query to be surfaced on one or more remote devices;
receive a selection of the suggested natural language query;
based on receiving the selection of the suggested natural language query, execute the suggested natural language query against the transcript; and
generate query results.

16. The system of claim 15, wherein the operations further comprise:
cause at least one of key topics or key speakers for the virtual meeting to be surfaced.

17. The system of claim 16, wherein the natural language query and the at least one of the key topics or key speakers are concurrently surfaced within a videoconference interface.

18. The system of claim 15, wherein generating the input signals comprises:
performing a semantic analysis on the transcript to identify one or more topics of the transcript; and
filtering the transcript based on the identified topics.

19. The system of claim 18, wherein filtering the transcript causes removal of non-informative content from the transcript for generation of input signals.

20. The system of claim 15, wherein:
an utterance in the transcript has a duration greater than an utterance-duration threshold;
a speaker associated with the utterance has a hierarchy level greater than a hierarchy threshold; and
the suggested natural language query includes a query regarding what the speaker said in the utterance.

* * * * *